(12) United States Patent
Green et al.

(10) Patent No.: US 7,711,212 B2
(45) Date of Patent: May 4, 2010

(54) JUNCTION FIELD EFFECT TRANSISTOR GEOMETRY FOR OPTICAL MODULATORS

(75) Inventors: William Michael John Green, Astoria, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 11/859,665

(22) Filed: Sep. 21, 2007

(65) Prior Publication Data

US 2009/0080826 A1    Mar. 26, 2009

(51) Int. Cl.
G02F 1/01 (2006.01)
G02B 6/12 (2006.01)
H01L 29/80 (2006.01)

(52) U.S. Cl. .................. 385/1; 385/14; 257/256
(58) Field of Classification Search .............. 385/1, 385/14; 257/256, 257

See application file for complete search history.

(56) References Cited

U.S. PATENT DOCUMENTS

| | | | |
|---|---|---|---|
| 4,517,581 A * | 5/1985 | Thompson | 257/257 |
| 5,021,361 A | 6/1991 | Kinoshita et al. | |
| 5,726,462 A | 3/1998 | Spahn et al. | |
| 5,963,358 A * | 10/1999 | Shields | 359/248 |
| 6,936,839 B2 | 8/2005 | Taylor | |
| 7,046,895 B1 | 5/2006 | Gunn et al. | |
| 7,136,544 B1 | 11/2006 | Gunn et al. | |
| 7,394,949 B1 * | 7/2008 | Feng et al. | 385/3 |
| 2006/0067602 A1 * | 3/2006 | Todori et al. | 385/8 |
| 2008/0113497 A1 * | 5/2008 | Tachibana et al. | 438/483 |

OTHER PUBLICATIONS

Ansheng Liu, Richard Jones, Ling Liao, Dean Samara-Rubio, Doron Rubin, Oded Cohen, Remus Nicolacescu & Mario Paniccia, A High Speed Silicon Optical Modulator Based on a Metal Oxide Semiconductor Capacitor, pp. 615-618, Nature, vol. 427, Feb. 12, 2004.
Ansheng Liu, Ling Liao, Doron Rubin, Hat Nguyen, Berkehan Cifticioglu, Yoel Chetrit, Nahum Izhaky, and Mario Paniccia, "High Speed Optical Modulation Based on Carrier Depletion in a Silicon Waveguide," Jan. 22, 2007 / vol. 15, No. 2 / Optics Express 660.
Qianfan Xu1, Bradley Schmidt1, Sameer Pradhan1 & Michal Lipson1, "Micrometre-Scale Silicon Electro-Optic Modulator," Nature|vol. 435|May 19, 2005.
Richard A Soref, "Silicon-Based Optoelectronics," Proceedings of the IEEE, vol. 81, No. 12, Dec. 1993.

* cited by examiner

*Primary Examiner*—Uyen-Chau N Le
*Assistant Examiner*—John M Bedtelyon
(74) *Attorney, Agent, or Firm*—Michael J. Buchenhorner; Vazken Alexanian

(57) ABSTRACT

An apparatus for controlling a signal includes an optical waveguide having a variable refractive index; an active device formed within the waveguide, the device having three electrodes, a drain, a source and a gate; and wherein the device is located within the waveguide so that current flowing from the drain to the source changes the refractive index.

3 Claims, 3 Drawing Sheets

HIGH current state: $V_{drain} > 0, V_{drain} < V_{gate}$

LOW current state: $V_{drain} > 0, V_{drain} \ll V_{gate}$

HIGH current state: $V_{drain} > 0, V_{drain} < V_{gate}$

LOW current state: $V_{drain} > 0, V_{drain} \ll V_{gate}$

JUNCTION FIELD EFFECT TRANSISTOR GEOMETRY FOR OPTICAL MODULATORS

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of electro-optic devices and more particularly relates to the field of electro-optic modulators.

BACKGROUND

Electro-optic modulators use an electric field to change the index of refraction of the substrate or medium where the beam of light (or laser) is found. Electro-optic modulators are optical devices which allow control of the power, phase, or polarization of a beam of light with an electrical control signal applied via a capacitor, p-i-n diode, or JFET, for example. The functionality is based on an electro-optic effect, that is the modification of the refractive index of a medium (e.g., crystal substrate) by an electric field in proportion to the field strength. Electro-optic devices can use free carrier dispersion to produce the refractive index change. In semiconductor materials, such as Silicon, the refractive index of light may be varied by varying the charge carrier concentration along the optical path. For example, when an electric potential is supplied to a Silicon P-N junction to forward bias a diode, the doped regions inject charge carriers into the Silicon depletion region. By free carrier dispersion, the change in the concentration of free charge carriers alters the refraction index.

Up to now the devices used to change the concentration of free charge carriers have been capacitors and p-i-n/p-n diodes. The majority of electro-optic modulators make use of the injection and/or depletion of free carriers, and the associated free carrier dispersion, within a region of the optical waveguide in which light is confined. Two types of two-terminal electrical devices have predominantly been used to modulate the density of free carriers, these being metal-oxide-semiconductor (MOS) capacitors, and p-i-n/p-n (diodes). The primary drawback of the MOS capacitor configuration is the limited overlap between the approximate 10 nm thick depletion/accumulation/inversion layer (where the concentration of free carriers is modulated by the gate voltage), and the optical mode, having a spatial extent of approximately 500 nm×500 nm, typically. While the p-i-n diode device geometry has been designed to dramatically improve upon the optical overlap issue, several other problems exist.

The p-i-n diode modulator can be used in two primary modes of operation. The first, in which the diode is first forward biased to inject minority carriers into the depletion region/waveguide core, and is then reverse biased to sweep out these carriers, is intrinsically slow. In forward bias, while forward current is flowing, the charge density within the waveguide takes a much longer time to reach steady state in comparison with when the diode is reverse biased. This results from the slow dynamics of minority carriers in silicon, and limits the fundamental modulation frequency at which an optical modulator/switch can be driven.

The second mode of operating a p-i-n diode modulator is in reverse bias depletion mode only. In this case, the diode is never forward biased to inject carriers, and only the concentration of the existing majority carriers (from dopants, thermal generation, etc.) is modulated within the diode depletion region/waveguide core. While the reverse bias only mode of operation enables intrinsically much faster modulation than permitted by the forward-reverse mode, the magnitude of modulation of the free carrier concentration is approximately ten times smaller, implying a ten times smaller change in the refractive index caused by free carrier dispersion. Therefore, p-i-n diode modulators operated in reverse bias only mode must be approximately ten times as long in order to attain the same modulation depth. The device footprint is thus adversely affected in order to obtain high speed modulation, often requiring the usage of traveling wave electrodes, further complicating the design.

Prior art two-terminal p-i-n/p-n diode modulators have the limitations that in forward-reverse bias operation, the forward biased diode turn-on is slow, restricting operation at higher speeds.

In reverse bias only operation, there is no introduction of excess carriers as in forward bias case, leading to the limitation that the net change in carrier concentration and waveguide refractive index is small. An additional solution to these problems is therefore required, in order to enable high frequency modulation/switching, within an ultra-compact device footprint.

SUMMARY OF THE INVENTION

The invention adds a control terminal to the control device to provide a finer adjustment to the injection of these free carriers into the modulating medium by controlling the depletion region of a JFET and thus obtain better response times.

Briefly, according to an embodiment of the invention an apparatus for controlling a light signal includes an optical waveguide having a variable refractive index; an active device formed within the waveguide, the device having three electrodes, a drain, a source and a gate; and wherein the device is located within the waveguide so that current flowing from the drain to the source changes the refractive index.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1A:
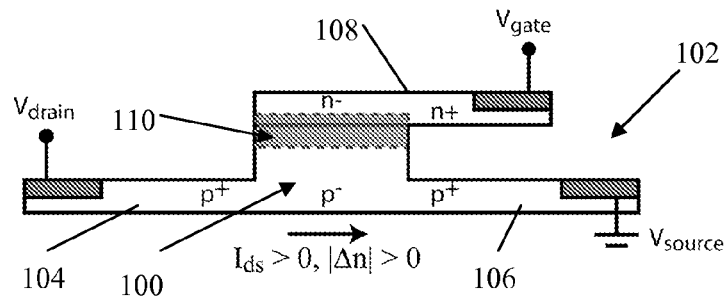
FIG. 1A is a cross-section of a junction field effect transistor (JFET) electrooptic waveguide, illustrating a state of operation with high drain-source current according to another embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

An embodiment of the invention makes use of the extra performance and functionality introduced by incorporating a third control terminal into the electrical device used to modulate free carrier concentration within the optical modulator. Several embodiments of the disclosed device are possible, however, the primary geometry makes use of a junction field effect transistor (JFET), incorporated within an optical waveguide.

Referring to FIG. 1A, there is shown an illustration of an optical waveguide 100 whose characteristics (e.g., refractive index) are modified by the JFET 102. The waveguide 100 includes the JFET 102 formed within the waveguide 100. The light travels perpendicular to the plane of the cross-section of the JFET 102. The JFET has a drain 104, a source 106, and a gate 108. The drain and source are formed in a p-type semiconductor material (e.g., silicon). The parts of the p-type region where the drain and source are located are more heavily doped than its middle. The part of the n-type region where the gate is located is more heavily doped than the part which connects to the drain-source channel. A positive voltage is applied at the drain 104 and a voltage, $V_{gate}$, greater than the drain voltage ($V_{drain}$) is applied at the gate. The drain to source path forms a channel where the current, $I_{ds}$, which flows perpendicular to the light passing through the optical waveguide 100. A depletion region 110 is formed at the junction between the n-type region and the p-type region. Under the conditions of FIG. 1A, this depletion region 110 is small and the current $I_{ds}$ is positive while the refractive index ($\Delta\eta$) is also positive.

A background concentration of majority carriers is introduced within the optical waveguide, by means of applying a bias current through the conductive channel (between the two terminals, source 108 and drain 104) within the waveguide 100 itself. The gate terminal 108 is used to modulate the concentration and/or spatial distribution of the free carriers within the optical waveguide 100, thereby modulating the refractive index affecting the light traveling within the waveguide. Such a JFET geometry permits the relative refractive index change between the ON and OFF states to be as large as in the case of forward-reverse operation of a p-i-n diode, on account of providing the bias current. In addition, the intrinsic modulation speed of the JFET configuration can be as large as that of the reverse bias only mode of the p-i-n diode, because only majority carriers are modulated by the gate terminal.

Figure 1B:
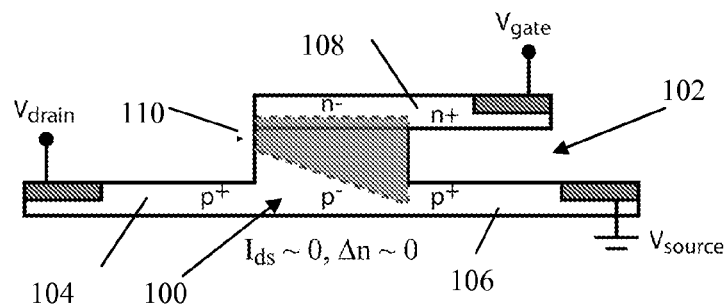
FIG. 1B is a cross-section of the JFET electrooptic waveguide of FIG. 1A, illustrating a state of operation with low drain-source current according to another embodiment of the invention.

Referring now to FIG. 1B, there is illustrated the optoelectronic device of FIG. 1A, operating at a low current state. In this case, the drain voltage (Vdrain) is positive and the gate voltage (Vg or Vgate) is much greater than the drain voltage Vdrain). This produces a bigger depletion region 110, causing the drain to source current Ids to be substantially smaller such that the change in the refractive index of the waveguide is approximately zero.

Figure 2A:
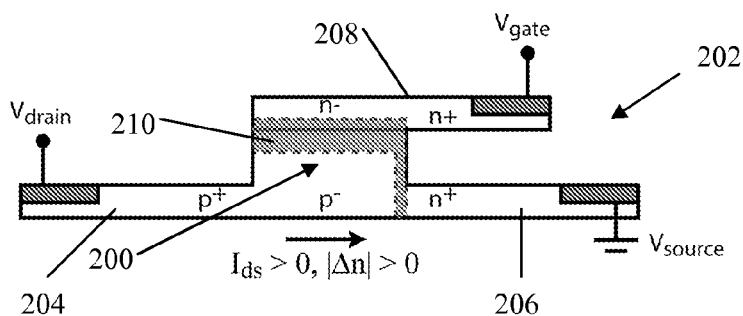
FIG. 2A is a cross-section of a gated diode electrooptic waveguide control device operating at a high current state for an optical modulator according to another embodiment of the invention.

FIG. 2A is a cross-section of a gated diode 202 electrooptic waveguide 200 operating at a high current state where Vd>0, Vd<<Vg, according to another embodiment of the invention. The gated diode 202 includes a drain made from a p+ (heavily doped)) semiconductor material and the source is made from an n+ (highly doped) semiconductor.

Figure 2B:
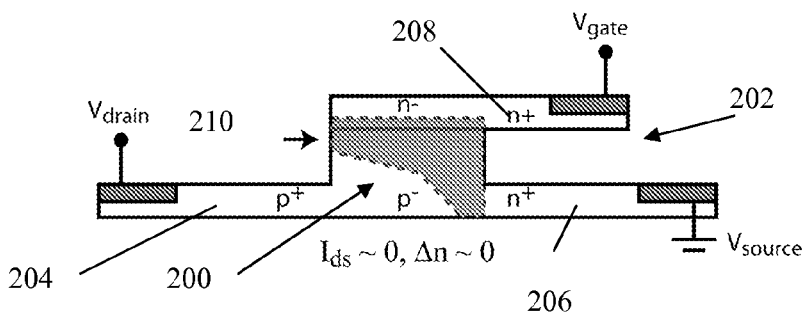
FIG. 2B is a cross-section of a gated diode electrooptic waveguide control device operating at a low current state for an optical modulator according to another embodiment of the invention.

Referring to FIG. 2B there is shown a cross-section of the gated diode of FIG. 2a operating in a low current state according to another embodiment of the invention. In this state of operation, the depletion region 210 is longer than in the state of FIG. 2A. This results in a condition where Ids and $\Delta n$ are approximately zero.

Figure 3:
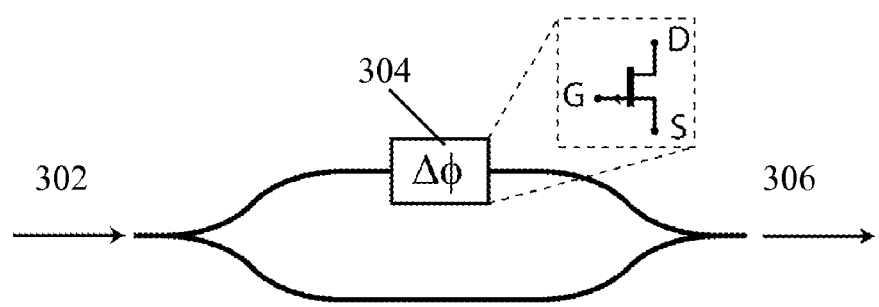
FIG. 3 is a Mach-Zehnder Interferometer with incorporated electrooptic phase shifter section, illustrating drain (D), source (S), and gate (G) terminals of the JFET according to another embodiment of the invention.

FIG. 3 is a Mach-Zehnder Interferometer with incorporated electrooptic phase shifter section, illustrating drain (D), source (S), and gate (G) terminals of the JFET according to another embodiment of the invention. In practical application, JFET or gated diode electrooptic waveguides may be used as optical phase shifters, and can be combined with passive waveguides to form a variety of electrically controlled tunable/modulated optical devices. Examples may include but are not limited to phase shifters, directional couplers, power splitters, interferometers, resonators, switches, filters, and modulators. FIG. 3 illustrates one such possible device application in the form of a Mach-Zehnder interferometer 300. At the input 302, light is divided into two waveguide branches by an optical power splitter 304. In the one branch, light travels through a passive waveguide, while in the other branch, light passes through an active phase shifter section 306, which incorporates a JFET or gated diode electrooptic waveguide. The drain, source, and gate terminals of the JFET are illustrated schematically in the figure. The relative phase, or optical path length, between the active and passive branches is controlled by the gate voltage at the electrooptic waveguide, as discussed above. At the output 308 of the Mach-Zehnder interferometer, light in both waveguide branches is recombined with a second power splitter/combiner. The relative phase of the light in the two branches at the output results in either constructive or destructive interference, leading to amplitude modulation of the transmitted output power. In this manner, the Mach-Zehnder interferometer with an incorporated JFET phase shifter section can be used as an optical amplitude modulator.

Figure 4:
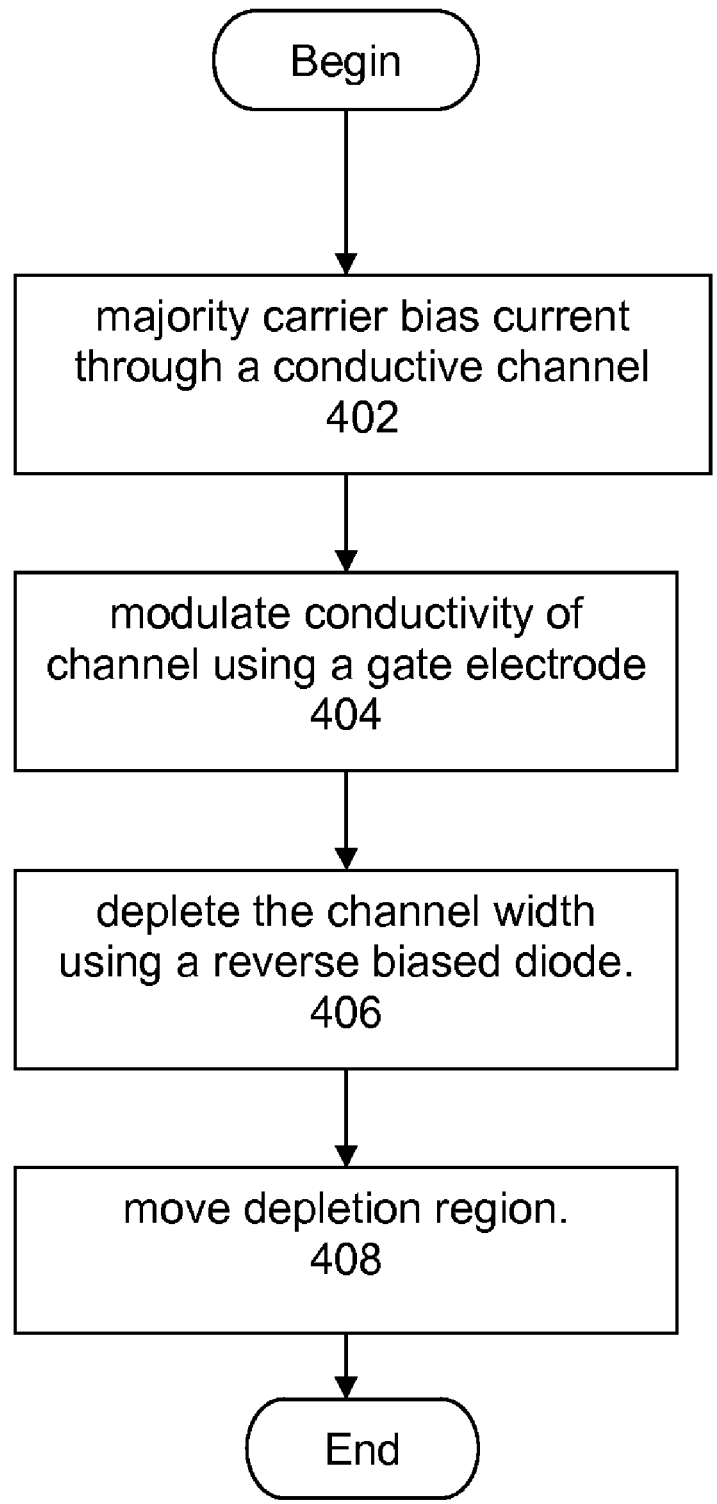
FIG. 4 is a flowchart of a modulator method according to another embodiment of the invention.

Referring to FIG. 4 there is shown a flow chart illustrating a method 400 of modulating a light beam carrier signal passing though a waveguide. In step 402 there is provided a majority carrier bias current through a conductive (low resistance) channel to improve the total $\Delta P$ (or $\Delta N$) (carrier concentration) swing, compared to reverse bias only operation. In step 404 the conductivity of the channel using a gate electrode is modulated. Step 406 depletes the channel width using a reverse biased diode. Step 408 uses spatial modulation of current across waveguide, and current extinction by moving depletion region, modulates $\Delta n$ (refractive index) across waveguide. This mode of operation results in a similar $\Delta n$ as forward-reverse bias operation of p-i-n, with the speed of minority carrier dynamics as in reverse bias only operation.

The result of the method 400 is similar to a JFET device, but uses a forward biased p-i-n diode to provide the bias current. However, current will be mostly minority in this case, as opposed to majority current through the JFET resistive channel.

Biasing Scheme for Operation:

The JFET electrooptic waveguide is biased into the high current state by application of a drain-source current Ids flowing transversely through the rib waveguide core, as shown in the top portion of FIG. 1A. This is a bias current consisting of majority carrier holes, on account of the being p+−p− −p+ doping profile between the drain and source terminals. This bias condition requires a positive drain voltage Vdrain >0, where the source terminal is assumed to be connected to ground, Vsource=0. In order to prevent the drain-gate junction from becoming forward biased, a small reverse bias must be placed on the gate, such that Vdrain<Vgate. However, in the high current state, this reverse bias must not be excessively large, so as to produce a depletion region which pinches off the conductive channel between the drain and source terminals. In the high current state, the drain-source current produces a large increase in the charge carrier concentration within the waveguide core (as compared to the case with Ids is approximately zero), resulting in a significant change in the refractive index of the waveguide.

In contrast, the low current state is achieved by increasing the reverse bias voltage on the gate, such that Vdrain<<Vgate. This causes the high resistivity depletion region to expand further into the waveguide core, dramatically decreasing the conductivity of the path between drain and source terminals, and effectively turning off the drain-source current, Ids is approximately zero. In the low current state, the charge carrier concentration within the waveguide core is much lower than in the high current state, returning the waveguide refractive index back to near its unperturbed value $|\Delta n| \sim 0$, with no voltage or current applied at the terminals.

Biasing and gate operation for the gated diode configuration is similar, with the exception that the drain-source bias current will begin to flow when V exceeds a minimum voltage, in order to reach the forward bias condition of the drain-source p-n/p-i-n junction. The operating bias current Ids can be set as desired by adjusting Vdrain as needed.

Details of Doping Profile for JFET and Gated Diode Configurations:

The exact doping profile required for device operation ultimately depends upon multiple design factors, including but not limited to tolerable free-carrier induced optical losses, restrictions on the available external bias current/voltage control circuitry, and minimization of deleterious ohmic heating effects within the device. Nevertheless, the table below presents a general description of the doping profile required to achieve the desired mode of operation.

TABLE 1

General doping profile and polarity for p-channel JFET electrooptic waveguide.

| Region | Dopant density | Polarity |
| --- | --- | --- |
| Channel | Low/Medium | p-type |
| Drain | High | p-type |
| Source | High | p-type |
| Gate | Medium/High | n-type |

TABLE 2

General doping profile and polarity for p-channel gated diode electrooptic waveguide.

| Region | Dopant density | Polarity |
| --- | --- | --- |
| Channel | Low/Medium | p-type |
| Drain | High | p-type |
| Source | High | n-type |
| Gate | Medium/High | n-type |

Those skilled in the art will understand that the device operation described here can also be extended to similar devices in which the conductive channel within the waveguide core is doped to be n-type rather than p-type (with the necessary inverted polarity of the drain, source, and gate regions). In addition, variations of the doping profile described here while preserving the overall operation of the devices are understood to be broadly included within the scope of this patent.

Therefore, while there has been described what is presently considered to be the preferred embodiment, it will understood by those skilled in the art that other modifications can be made within the spirit of the invention.

The invention claimed is:

1. A method of modulating a light beam carrier signal, the method comprising:

passing the light beam carrier signal though a waveguide with Junction Field Effect Transistor (JFET) formed therein, wherein the JFET comprises a gate, a drain, a source, and a drain to source conductive channel having a variable conductivity;

passing a majority carrier bias current through the drain to source conductive channel;

modulating the conductivity of the drain to source conductive channel using a gate electrode to receive a modulating signal;

depleting a width of the drain to source conductive channel using a reverse bias voltage to form a depletion region;

spatially modulating flow of current across the waveguide to change the degree of overlap between the waveguide mode and the free carrier distribution; and modulating a refractive index ($\Delta n$) across the waveguide by varying voltage at the gate to produce a modulated light beam carrier signal.

2. The method of claim 1 further comprising increasing the voltage from the gate to the drain until there is no current flowing from the drain to the source.

3. The method of claim 1 further comprising:

applying a passive voltage at the drain and a voltage at the gate that is greater than the voltage at the drain.

* * * * *